May 8, 1934.  M. FIELDMAN  1,957,997
HYDRAULIC SHOCK ABSORBER
Original Filed July 27, 1929
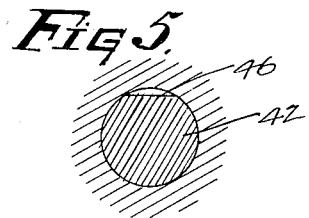
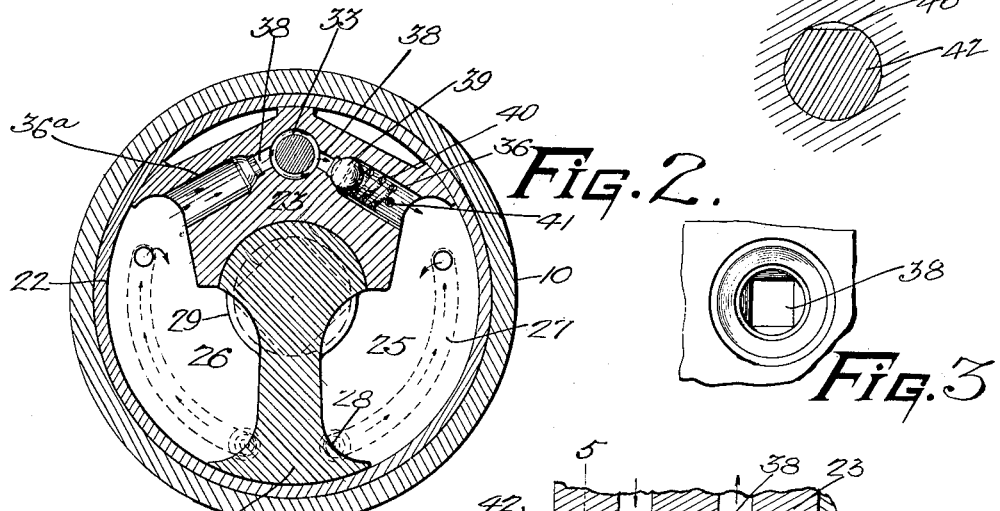
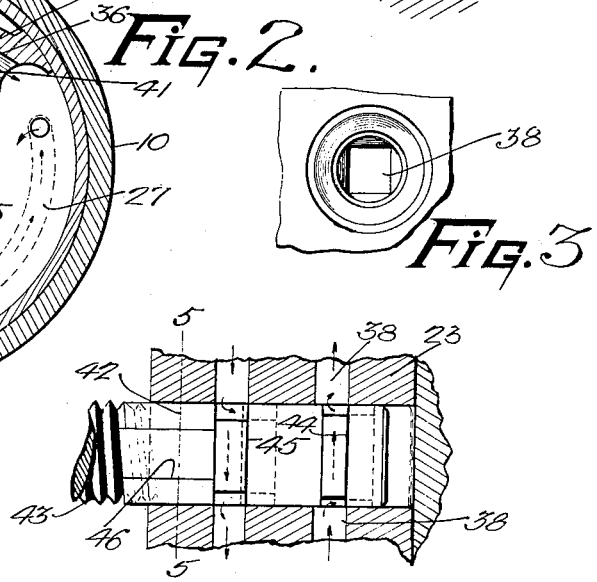
Inventor.
Micheal Fieldman
by his Attorneys
Howson & Howson Patented May 8, 1934

1,957,997

UNITED STATES PATENT OFFICE 1,957,997

HYDRAULIC SHOCK ABSORBER

Michael Fieldman, Philadelphia, Pa., assignor of one-half to N. A. Petry Company, Inc., Philadelphia, Pa., a corporation of Pennsylvania Application July 27, 1929, Serial No. 381,512
Renewed September 22, 1933

12 Claims. (Cl. 138—39)

This invention relates to shock absorbers and more particularly to a hydraulic shock absorber of the oscillating piston type.

An important object of the invention is the provision of a structure of this character which may be very cheaply produced and which may be assembled rapidly and efficiently.

Shock absorbers of the type described usually include what is known as a partitioning member which is secured within an annular casing and which co-acts with an oscillating piston to produce pressure chambers. The pressures produced in these chambers by oscillation of the piston are regulated through a suitable valve means which is usually carried by either the piston or the partitioning element. The partition must, of course, be secured in position in the casing very solidly and a further object of this invention is the provision in a structure of this character of an arrangement such that the securing element and a valve controlling the pressures of the respective chambers may be incorporated in a single unit.

A further object of the invention is the provision of a shock absorber which is responsive both to slight and great shocks. In the ordinary construction of such devices the absorber which is capable of accommodating slight shocks will not provide a proper control for shocks of greater intensity and, conversely, when adjusted to take care of great shocks will not compensate for shocks of slight intensity. By a structure in accordance with my invention both types of shocks are absorbed and a smooth operation of the machine insured.

A still further object of the invention is to provide a structure of this character wherein means are provided for permitting the escape of air from the pressure chambers and the replacement of this air by oil.

These and other objects I attain by the construction shown in the accompanying drawing wherein, for the purpose of illustration, I have shown a preferred embodiment of my invention and wherein:

Fig. 1 is a vertical sectional view through a shock absorber constructed in accordance with my invention;

Fig. 2 is a section on line 2—2 of Fig. 1;

Fig. 3 is an enlarged end elevation of one of the ports;

Fig. 4 is an enlarged semi-diagrammatic sectional view illustrating the valve control and the adjustment thereof;

Fig. 5 is a section on line 5—5 of Fig. 4; and

Fig. 6 is a section on line 6—6 of Fig. 1.

Referring now more particularly to the drawing, the numeral 10 generally designates a cup-shaped casing the side walls of which interiorly formed produce an annular seat 11. The base of the cup is provided with an axial aperture 12 which, interiorly of the cup, is surrounded by an annular flange 13 of slightly greater diameter than the opening. At one point the wall of the casing and this flange are connected by a lug or boss 14, this lug having its face slightly lower than the inner end face of the flange 13 which is coplanar with the annular seat 11. In alignment with the boss the flange is notched as at 15 for a purpose presently to appear.

A partition plate 16 is provided which seats at its margin upon the shoulder 11 and which is formed with an axial opening 17 of the same size as the opening 12 of the casing. This opening at the face of the plate which confronts the bottom of the casing is defined by an outstanding flange 18 which projects into and interiorly fits the flange 13 of the casing. This partition subdivides the casing into storage and working compartments 19 and 20, of which the storage compartment lies between the base of the casing and the partition plate and the working compartment lies between the inner face of the partition and a cover plate 21 screwed into the mouth of the casing. Between the cover plate and the partition plate an annular bushing wall 22 is clamped and serves to define the outer wall of the working chamber.

Within the working chamber are disposed a partitioning member 23 and a piston 24 which combine to subdivide the working chamber into high and low pressure compartments 25 and 26. Each compartment 25 and 26, at a point adjacent the upper end thereof, is in communication with the storage chamber through ports 27 having check valves 28 therein which are open toward the working compartments. This piston 24 has secured thereto a shaft 29 projecting through the openings 17 and 12 of the partition plate and casing and through packing 30 arranged between the end of the flange 18 and the casing wall within flange 13. In opposition to the end of flange 18 a collar 31 is fixed to shaft 29. The flange 13 is grooved as at 32 to place the end of this flange in connection with the notch 15. The structure so far described is that illustrated in my co-pending application Serial No. 374,143 filed June 27, 1929 for Hydraulic shock absorbers.

In accordance with the present invention the partition element is provided with a bore 33 extending from front to back thereof, aligning with a bore 34 formed in the partition element and with a threaded bore 35 formed in the boss 14. The bore 33 has communicating therewith pairs of aligned bores 36, 36—a and 37, 37—a. The bores 36 and 37 communicate with the high pressure chamber 25 and low pressure chamber 26 respectively, while the bores 36—a and 37—a communicate with the opposite chambers from their associated bores 36 and 37. Each bore 36 and 37 communicates with the bore 33 through a restricted port 38 and at the junction of the restricted port 38 with the main bore a valve seat is formed for a spring-pressed check ball 39 the springs 40 of which are held from displacement by pins 41 or some other suitable anchor. The bores 36—a and 37—a preferably likewise communicate with the bore 33 through such ports 38 and have formed at their inner ends valve seats for the reception of check balls and the associated pressure springs so that the operation of the absorber may be reversed if desired to produce "rights" and "lefts". Ports 38 are equidistantly spaced from the outer faces of the partition element 23 so that reversal would have no effect upon the operation of the combined valve and dowel structure hereinafter set forth, thus eliminating possibility of errors in assembly.

Bores 33, 34 and 35 co-act to receive a combined dowel and valve element 42 which comprises a body circular and cross section and of a size to rotatably and slidably fit in the bore 33, and having a threaded shank 43 to engage in the bore 35. The body has formed therein two annular grooves 44 and 45, which grooves have their outer edge walls spaced apart a distance equal to the distance between corresponding faces of the ports 38. Groove 45 is of greater depth and width than groove 44 and, accordingly, adjustment of the combined dowel and valve element as illustrated in Fig. 4 will result in closure of port 38 of the bore 37 before the corresponding port of bore 38 is closed. At this time the end of the dowel element will come into contact with cover plate 21 so that further adjustment thereof is impossible.

Groove 45 is placed in communication with the space between the face of lug 14 and the partition plate by a suitable port 46 at present shown as provided by forming a flat upon the face of the body. The outer end of the threaded bore 35 of the boss is preferably equipped with a threaded taper plug 47 for sealing the same, removal of this plug providing access to the threaded end 43 of the combined valve and dowel to enable adjustment thereof. In the present instance I have shown the outer end of this threaded portion as equipped with a slot for the reception of a screw driver.

In operation of an apparatus constructed in accordance with the foregoing, when the piston is oscillated, escape of fluid from one side to the other of the piston must necessarily occur through the channels 36, 36—a or 37, 37—a and the restricted ports 38. Passage of the fluid in either direction is resisted by the check balls 39 with a pressure determined by the exposed ball surface and the strength of the spring employed for seating the ball. These resistances serve to absorb small shocks and to provide the resistance where the amount of liquid forced by the piston through the ports is not sufficient to set up any back pressure in the grooves 44 or 45. When, however, movement of the piston is rapid, as in the case of a severe shock, the groove 44 or 45 affected sets up a back pressure, the extent of which is determined by the force of the shock, and by the area of the groove as determined by the position of the valve element. By regulation of this valve element the shock absorber can be adapted for the absorption of shocks of any desired intensity within reasonable limits. The groove 44 constitutes what may be termed a high pressure groove and is employed in the transmission of fluid from the high pressure to the low pressure chamber, while the groove 45 is a low pressure groove and provides for movement of fluid in the opposite direction.

In operation of the shock absorber, any air in the high pressure chamber will be forced through the groove 44 to the low pressure chamber. On the return or rebound stroke this air in its passage through groove 45 escapes by way of the port 46 to the reserve chamber 19. Escape of the air will result in a partial vacuum in one or the other of the working compartments at opposite sides of the piston with the result that fluid will be withdrawn from the reserve chamber through a port 27 to complete the filling of this compartment.

Since the construction illustrated is obviously capable of a considerable range of change and modification without in any manner departing from the spirit of my invention, I do not wish to limit myself to such specific structure except as hereinafter claimed.

I claim:

1. In a shock absorber, a casing providing a working chamber, a partition element in the chamber, a piston likewise in the chamber and combining with the partitioning element to subdivide the chamber into working compartments, said partitioning element having ports extending between the compartments and a single element holding said partitioning element against movement in the chamber and constituting a valve controlling the passage of fluid through said ports.

2. In a shock absorber, a casing providing a working chamber, a partitioning element in the working chamber, a piston likewise in the chamber and combining with said partitioning element to subdivide the chamber into compartments disposed at opposite sides of the piston, ports in said partitioning element placing said chambers in communication with one another, each of said ports including a spring-pressed valve preventing movement of fluid therethrough in one direction and having a restricted area to provide back pressures in event of rapid movement of the piston, and a valve element for regulating the effective sizes of such restricted areas.

3. In a shock absorber, a casing providing a working chamber, a partitioning element in the working chamber, a piston likewise in the chamber and combining with said partitioning element to subdivide the chamber into compartments disposed at opposite sides of the piston, ports in said partitioning element placing said chambers in communication with one another, each of said ports including a spring-pressed valve preventing movement of fluid therethrough in one direction and having a restricted area to provide back pressures in event of rapid movement of the piston, and a valve element for regulating the effective sizes of such restricted areas, said valve element constituting a dowel for maintaining the partitioning element in position in the chamber.

4. In a shock absorber, a casing providing a working chamber, a partitioning element in the working chamber, a piston likewise in the chamber and combining with said partitioning element to subdivide the chamber into compartments disposed at opposite sides of the piston, ports in said partitioning element placing said chambers in communication with one another, each of said ports including a spring-pressed valve preventing movement of fluid therethrough in one direction and having a restricted area to provide back pressures in event of rapid movement of the piston, a bore intercepting said ports and a member adjustable in said bore and having grooves aligning with said ports.

5. In a shock absorber, a casing providing a working chamber, a partitioning element in the working chamber, a piston likewise in the chamber and combining with said partitioning element to subdivide the chamber into compartments disposed at opposite sides of the piston, ports in said partitioning element placing said chambers in communication with one another, each of said ports including a spring-pressed valve preventing movement of fluid therethrough in one direction and having a restricted area to provide back pressures in event of rapid movement of the piston, a bore intercepting said ports and a member adjustable in said bore and having grooves aligning with said ports, said member having an end portion thereof secured in position in the casing whereby the member constitutes a dowel maintaining said partitioning element in position in the chamber.

6. In a shock absorber, a casing subdivided to provide working and storage chambers, a partitioning element in the chamber, a piston likewise in the working chamber and co-acting with the partitioning element to subdivide the chamber into working compartments, the partitioning element having ports connecting said compartments and a single element constituting a valve controlling the effective area of said ports holding said partitioning element against movement and providing an air leakage port between one of said compartments and said storage chamber.

7. In a shock absorber, a casing, a partition plate therein subdividing the casing into storage and working chambers, a partitioning element for the working chamber, a piston in the working chamber and co-acting with the partitioning element to subdivide the working chamber into two compartments, ports in said partitioning element, each providing one-way communication between one of said chambers and the other thereof, a bore intercepting said ports and aligning with an opening formed in the partition plate and a member mounted in said bore and opening and adjustably secured in position in the casing constituting a valve controlling the effective areas of said ports and a dowel for preventing movement of the partitioning element.

8. In a shock absorber, a casing, a partition plate therein subdividing the casing into storage and working chambers, a partitioning element for the working chamber, a piston in the working chamber and co-acting with the partitioning element to subdivide the working chamber into two compartments, ports in said partitioning element, each providing one-way communication between one of said chambers and the other thereof, a bore intercepting said ports and aligning with an opening formed in the partition plate and a member mounted in said bore and opening and adjustably secured in position in the casing constituting a valve controlling the effective areas of said ports and a dowel for preventing movement of the partitioning element, there being a port in said member providing communication between the storage chamber and one of the first-named ports.

9. In a shock absorber, a casing providing a working chamber, a partition element in the chamber, a piston in the chamber and co-acting with the partition element to subdivide the chamber into working compartments, ports directly connecting said compartments and each having a spring-pressed check resisting flow therethrough, the partition element having a bore intercepting said ports and a member adjustable in said bore for regulating the effective sizes of said ports.

10. A shock absorber of the oscillating piston type wherein each working chamber is in communication with the other working compartment through a port providing one-way communication therebetween, said ports each having means providing a substantially constant resistance to flow therethrough and a common element associated with said ports for regulating the effective area thereof.

11. In a shock absorber of the oscillatory piston type, a casing providing a working chamber, a partition element in the chamber, an oscillatory piston likewise in the chamber and combining with the partitioning element to subdivide the chamber into working compartments, said partitioning element including a pair of passages connecting said working compartments, said passages each providing a metering groove and a pressure-controlling spring-seated valve in series with one another.

12. In a shock absorber of the oscillatory piston type, a casing providing a working chamber, a partition element in the chamber, an oscillatory piston likewise in the chamber and combining with the partitioning element to subdivide the chamber into working compartments, said partitioning element including a pair of passages connecting said working compartments, said passages each providing a metering groove and a pressure-controlling spring-seated valve in series with one another, said passages permitting flow of fluid in one direction only, the metering groove being in advance as regards the direction of flow of the fluid.

MICHAEL FIELDMAN.